(12) United States Patent
Nelson, Jr. et al.

(10) Patent No.: US 10,152,074 B2
(45) Date of Patent: Dec. 11, 2018

(54) ENERGY MANAGEMENT USING A WEARABLE DEVICE

(71) Applicant: Honeywell International Inc., Morristown, NJ (US)

(72) Inventors: John Edward Nelson, Jr., Eden Prairie, MN (US); Edward Koch, San Rafael, CA (US); David Justin McCurnin, Coon Rapids, MN (US)

(73) Assignee: Honeywell International Inc., Morris Plains, NJ (US)

( * ) Notice: Subject to any disclaimer, the term of this patent is extended or adjusted under 35 U.S.C. 154(b) by 470 days.

(21) Appl. No.: 14/734,696

(22) Filed: Jun. 9, 2015

(65) Prior Publication Data

US 2016/0363946 A1 Dec. 15, 2016

(51) Int. Cl.
*G05F 1/66* (2006.01)
*G05B 15/02* (2006.01)
*G06F 1/16* (2006.01)

(52) U.S. Cl.
CPC ............... *G05F 1/66* (2013.01); *G05B 15/02* (2013.01); *G06F 1/163* (2013.01); *G05B 2219/2642* (2013.01)

(58) Field of Classification Search
CPC ............ G05F 1/66; G06F 1/163; G05B 15/02
See application file for complete search history.

(56) References Cited

U.S. PATENT DOCUMENTS

| 8,234,017 | B2 | 7/2012 | Ahn |
| 8,667,132 | B2 | 3/2014 | Koch |
| 2003/0171851 | A1* | 9/2003 | Brickfield ............... H02J 3/008 700/286 |
| 2005/0078184 | A1* | 4/2005 | Sakai ............... G08B 13/19643 348/143 |
| 2009/0048718 | A1* | 2/2009 | Richard ........... G06Q 10/06312 700/296 |
| 2010/0070101 | A1 | 3/2010 | Benes et al. |
| 2010/0138065 | A1* | 6/2010 | Taft ........................ H02J 3/14 700/295 |

(Continued)

OTHER PUBLICATIONS

"Affordable Building Automation System Enabled by the Internet of Things (Iot)". Accessed from http://www.intel.com/content/dam/www/program/embedded/internet-of-things/blueprints/iot-building-automation-system-blueprint.pdf. 2014. pp. 1-6.

(Continued)

*Primary Examiner* — Christopher E. Everett
(74) *Attorney, Agent, or Firm* — Brooks, Cameron & Huebsch, PLLC

(57) ABSTRACT

Energy management using a wearable device is described herein. One apparatus includes a user interface, a memory, and a processor configured to execute executable instructions stored in the memory to receive a communication from a utility information system of a utility, wherein the communication includes information associated with energy being provided to a facility by the utility, provide, via the user interface, the information to a user of the apparatus, receive, via the user interface, a command from the user to adjust energy consumption of the facility based, at least in part, on the information, and send the command to an energy management system of the facility, wherein the apparatus is a wearable device.

16 Claims, 5 Drawing Sheets

(56) References Cited

U.S. PATENT DOCUMENTS

| | | | | | |
|---|---|---|---|---|---|
| 2011/0018731 | A1* | 1/2011 | Linsky | | G06F 1/163 |
| | | | | | 715/863 |
| 2011/0046792 | A1* | 2/2011 | Imes | | H04L 67/42 |
| | | | | | 700/278 |
| 2011/0153109 | A1* | 6/2011 | Drake | | H02J 3/14 |
| | | | | | 700/296 |
| 2012/0065800 | A1* | 3/2012 | Baba | | H02J 3/14 |
| | | | | | 700/295 |
| 2012/0109399 | A1 | 5/2012 | Tran | | |
| 2012/0277920 | A1* | 11/2012 | Koch | | G06F 17/3087 |
| | | | | | 700/286 |
| 2013/0083805 | A1* | 4/2013 | Lu | | H04L 12/2807 |
| | | | | | 370/401 |
| 2013/0110299 | A1 | 5/2013 | Meyerhofter et al. | | |
| 2013/0211614 | A1* | 8/2013 | Choi | | G05B 15/02 |
| | | | | | 700/295 |
| 2013/0254151 | A1* | 9/2013 | Mohagheghi | | G06Q 30/0621 |
| | | | | | 706/46 |
| 2013/0332000 | A1 | 12/2013 | Imes et al. | | |
| 2015/0106770 | A1* | 4/2015 | Shah | | H04M 1/64 |
| | | | | | 715/863 |
| 2016/0047565 | A1* | 2/2016 | Robinson | | H04L 12/2803 |
| | | | | | 700/278 |
| 2016/0056629 | A1* | 2/2016 | Baker | | G05B 15/02 |
| | | | | | 700/276 |
| 2016/0084889 | A1* | 3/2016 | Mezic | | H02J 3/28 |
| | | | | | 702/60 |
| 2016/0127875 | A1* | 5/2016 | Zampini, II | | H04W 4/043 |
| | | | | | 370/311 |
| 2016/0170389 | A1* | 6/2016 | Im | | G05B 15/02 |
| | | | | | 700/275 |
| 2016/0179070 | A1* | 6/2016 | Hwang | | G05B 15/02 |
| | | | | | 700/83 |
| 2016/0330285 | A1* | 11/2016 | Brophy | | H04L 67/125 |

OTHER PUBLICATIONS

Santiago Grijalva. "Prosumer-Based Decentralized Control for the Future Grid". IEEE. ISGT Panel of Transactive Energy. Feb. 18, 2015. 68 pages.

Mary Ann Piette, et al. "Improved Power Grid Stability and Efficiency with a Building-Energy Cyber-Physical System". National Workshop on Research Directions for Future Cyber Physical Energy Systems. Baltimore, MD. Jun. 2009. pp. 1-3.

Matthew Crosby, et al. "Is wearable tech the next big thing in energy?". Accessed from http://www.csmonitor.com/Environment/Energy-Voices/2014/1006/Is-wearable-tech-the-next-big-thing-in-energy. Oct. 6, 2014. 7 pages.

* cited by examiner

ENERGY MANAGEMENT USING A WEARABLE DEVICE

TECHNICAL FIELD

The present disclosure relates to energy management using a wearable device.

BACKGROUND

An energy management system (EMS) can be used to manage (e.g., control) the energy consumption of a facility. An EMS can be any system capable of controlling the loads of the facility that consume energy. For example, an EMS of a residential home can be, and/or include, a thermostat.

In order to operate previous EMSs, however, a user may need to be at a fixed location, such as at the location of the EMS itself, or at the location of a computer based operational terminal for the EMS. As such, if the user is not at one of these fixed locations, he or she may be unable to manage the energy consumption of the facility.

Additionally, utilities may attempt to communicate with their customers to enable their customers to better manage the energy consumption of their facilities. For example, a utility may send a customer energy prices and/or notifications of upcoming demand response events (e.g., instances in which the utility may attempt to manage the demand for electricity by their customers in response to electricity supply conditions).

In previous approaches, however, the customer may need to be at a fixed location to receive such communications from the utility. As such, if the user is not at the fixed location, he or she may not be able to receive such communications from the utility, and hence may not be able to utilize such communications to better manage the energy consumption of his or her facility.

DETAILED DESCRIPTION

Figure 1:
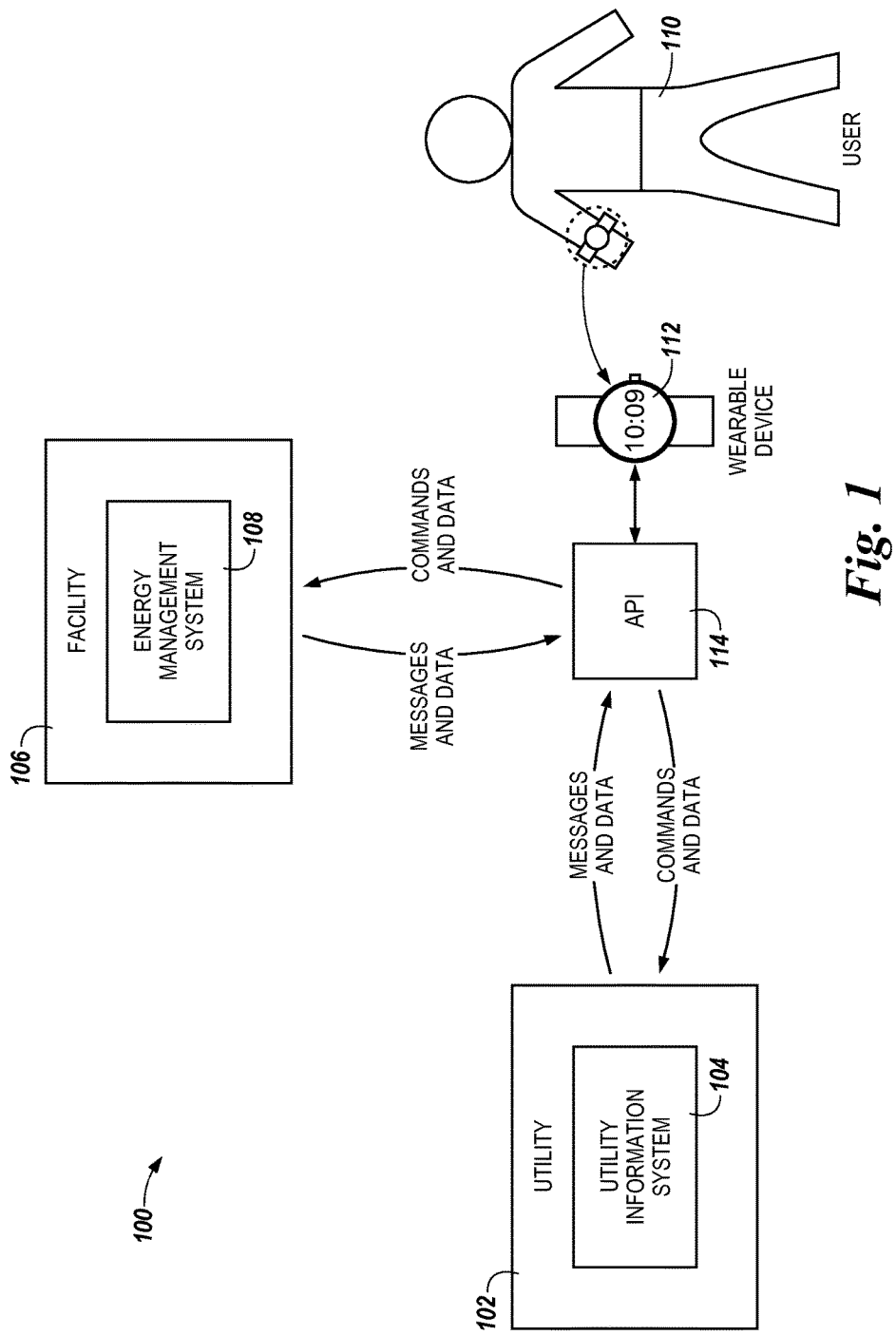
FIG. 1 illustrates an example of a system for energy management using a wearable device in accordance with one or more embodiments of the present disclosure.

Energy management using a wearable device are described herein. For example, one or more embodiments include a user interface, a memory, and a processor configured to execute executable instructions stored in the memory to receive a communication from a utility information system of a utility, wherein the communication includes information associated with energy being provided to a facility by the utility, provide, via the user interface, the information to a user of the apparatus, receive, via the user interface, a command from the user to adjust energy consumption of the facility based, at least in part, on the information, and send the command to an energy management system of the facility, wherein the apparatus is a wearable device.

Managing energy using a wearable device in accordance with the present disclosure can allow a user to manage the energy consumption of a facility (e.g., operate the energy management system (EMS) of the facility and/or receive communications from the utility) from wherever the user may be located and/or wherever the user goes. For instance, the user does not have to be located at a fixed location (e.g., the location of the EMS of the facility, or the location of the operational terminal of the EMS) in order to manage the energy consumption of the facility.

Further, managing energy using a wearable device in accordance with the present disclosure can allow a user to manage the energy consumption of a facility in a manner that is relevant to the location of the user. For example, if the user is moving between different facilities, the wearable device may only provide the user with the energy prices and/or demand response events that are relevant to the particular facility at which the user is currently located (e.g., the wearable device may not provide the user with energy prices and/or demand response events that are not relevant to that facility). Further, if a facility has multiple EMSs, the wearable device may allow the user to operate only the EMS that is relevant to the particular location of the user in the facility.

As such, managing energy using a wearable device in accordance with the present disclosure can allow a user to manage the energy consumption of a facility in a better manner than previous energy management approaches. For instance, the user may be able to manage the energy consumption of the facility in a quicker, easier, and/or more efficient manner than using previous energy management approaches.

In the following detailed description, reference is made to the accompanying drawings that form a part hereof. The drawings show by way of illustration how one or more embodiments of the disclosure may be practiced.

These embodiments are described in sufficient detail to enable those of ordinary skill in the art to practice one or more embodiments of this disclosure. It is to be understood that other embodiments may be utilized and that mechanical, electrical, and/or process changes may be made without departing from the scope of the present disclosure.

As will be appreciated, elements shown in the various embodiments herein can be added, exchanged, combined, and/or eliminated so as to provide a number of additional embodiments of the present disclosure. The proportion and the relative scale of the elements provided in the figures are intended to illustrate the embodiments of the present disclosure, and should not be taken in a limiting sense.

The figures herein follow a numbering convention in which the first digit or digits correspond to the drawing figure number and the remaining digits identify an element or component in the drawing. Similar elements or components between different figures may be identified by the use of similar digits. For example, 102 may reference element "02" in FIG. 1, and a similar element may be references as 202 in FIG. 2.

As used herein, "a" or "a number of" something can refer to one or more such things. For example, "a number of facilities" can refer to one or more facilities.

FIG. 1 illustrates an example of a system 100 for energy management using a wearable device 112 in accordance with one or more embodiments of the present disclosure.

Wearable device 112 can be, for example, a smart watch. However, embodiments of the present disclosure are not so limited, and can include any type of device that can be worn by a user (e.g., user 110).

In the example illustrated in FIG. 1, wearable device 112 is being worn by user 110. User 110 can be, for example, a facility manager that may be responsible for managing the operations of a facility (e.g., facility 106) as it relates to energy consumption. For instance, user 110 can be a person responsible for spending all of his or her time managing a large facility operation, or user 110 can be a small business or residential home owner that may do nothing more than adjust its thermostat and lights. User 110 may be at various locations during the course of the day on and/or off site of the facility.

As shown in FIG. 1, system 100 can include an application programming interface (API) 114 associated with wearable device 112. In some embodiments, wearable device 112 can include API 114 (e.g., API 114 may be located on or in wearable device 112). In some embodiments, API 114 can be located remotely from wearable device 114, such as, for example, on a remote server. In embodiments in which API 114 is located remotely from wearable device 112, wearable device 112 may communicate wirelessly (e.g., interface) with API 114 (e.g., with the server) to send information to and/or receive information from API 114. Wearable device 112 may be able to communicate wirelessly using technologies such as cellular media, WiFi, or any other wireless communications channel, as will be further described herein. Further, in embodiments in which API 114 is located remotely from wearable device 112, wearable device 112 may be one of a number of wearable devices and/or systems communicating with API 114 (e.g., other wearable devices and/or systems may also send information to and/or receive information from API 114).

Wearable device 112 may include a user interface that can display messages and/or data communicated via the wireless communications and receive inputs from user 110 that can be transmitted via the wireless communications, as will be further described herein. Further, wearable device 112 may be able to determine its location, either by itself or by the system with which it is communicating, as will be further described herein.

As shown in FIG. 1, system 100 can include a utility 102. Utility 102 can be any type of utility, independent system operator, service provider, etc. that provides energy to a facility (e.g., facility 106). Utility 102 can include a utility information system (UIS) 104 that is responsible for interacting with customers (e.g., user 110) of utility 102 with regards to energy consumption matters. UIS 104 may be and/or include a wide range of systems, and may include a demand response management system or other system responsible for sending out dynamic rate information.

As shown in FIG. 1, system 100 can include a facility 106. Facility 106 can be any type of facility, location, building, etc. that receives and/or consumes (e.g., uses) energy from utility 102. For example, facility 106 may be a large commercial or industrial facility, a small business, or a residential home, among other types of energy consuming facilities.

Facility 106 can include an energy management system (EMS) 108 that is used to manage (e.g., control) the energy consumption of facility 106. EMS 108 can be any system capable of controlling the loads of facility 106 that consume energy. For example, in embodiments in which facility 106 is a large industrial facility, EMS 108 can be an industrial control system. As an additional example, in embodiments in which facility 106 is a residential home, EMS 108 can be and/or include a thermostat.

Although the example illustrated in FIG. 1 shows EMS 108 being located at facility 106, embodiments of the present disclosure are not so limited. For example, in some embodiments, EMS 108 can be a cloud-based system, and/or a central system that manages multiple facilities, that is located remotely from (e.g., outside of) facility 106.

Wearable device 112 can be used by user 110 to communicate with UIS 104 and EMS 108. For example, as shown in FIG. 1, user 110 can use wearable device 112 (e.g., API 114) to receive messages and data from UIS 104 and EMS 108, and to send commands and data to UIS 104 and EMS 108.

Wearable device 112 (e.g., API 114) can communicate with UIS 104 and EMS 108 via a wireless communication channel or channels, such as a wireless network or networks (not shown in FIG. 1 for simplicity and so as not to obscure embodiments of the present disclosure). The wireless network(s) can be, for instance, a wide area network (WAN) such as the Internet, a local area network (LAN), a personal area network (PAN), a campus area network (CAN), or metropolitan area network (MAN), among other types of wireless networks.

As used herein, a "network" can provide a communication system that directly or indirectly links two or more computers and/or peripheral devices and allows users to access resources on other computing devices and exchange messages with other users. A network can allow users to share resources on their own systems with other network users and to access information on centrally located systems or on systems that are located at remote locations. For example, a network can tie a number of computing devices together to form a distributed control network.

A network may provide connections to the Internet and/or to the networks of other entities (e.g., organizations, institutions, etc.). Users may interact with network-enabled software applications to make a network request, such as to get a file or print on a network printer. Applications may also communicate with network management software, which can interact with network hardware to transmit information between devices on the network.

As an example, wearable device 112 (e.g., API 114) can receive (e.g., via the wireless network) a communication (e.g., message) from UIS 104. The communication can include information associated with energy being provided to facility 106 by utility 102, such as, for instance, the price (e.g., the current and/or future price) of the energy. Additionally or alternatively, the communication (e.g., the information in the communication) can include a notification (e.g., signal) of a demand response event associated with the energy being provided to facility 106 by utility 102.

Demand response may refer to a mechanism used by utilities (e.g., utility 102) to encourage customers (e.g., user 110) to reduce their energy demand, and thereby reduce the peak demand for energy (e.g., electricity). For example, demand response may refer to management of the energy demand by customers in response to supply conditions (e.g., customers may reduce their energy consumption at critical times and/or costs in response to market prices for energy).

As part of a demand response program, a utility may deliver a demand response signal to a participating customer to notify the customer of an upcoming demand response event. The signal may incorporate business level information, such as prices, reliability, and/or shed levels, for instance, which can be processed and used to execute the demand response program for the facility. That is, the signal may include information related to businesses, pricing, load control, etc.

Demand response programs can take many forms. For example, demand response programs may relate to the distribution of resources including, but not limited to, electricity, water, and/or natural gas. Demand response programs can differ from standard rates and tariffs in that demand response programs are designed to allow the utility to take specific actions to influence the load profiles of participating facilities at peak consumption times or periods on a grid. These peak consumption time periods may cause critical grid reliability issues which should be addressed, but may also trigger economic factors where the price of electricity or other energy commodity reaches a critical level which may be ameliorated by reducing the overall consumption on the grid during those time periods. These critical time periods, during which the utility may need to influence a load profile of the facility, may be referred to as demand response events.

As an additional example, a demand response program may increase the use of energy at times. For example, if the utility has excess energy, for example, in the middle of the night, it would like to and/or need to use, the utility may decide to improve the temperature in occupied areas of the facility that may normally be operating at conditions designed to reduce energy use. This may occur as utilities increase the amount of energy they produce using renewable resources (e.g., solar or wind).

The utility may attempt to influence the load profile of the facility by sending out a demand response signal that is specific to the demand response event. However, the load within the facility may ultimately be affected by demand response events via demand response signals to which the customer acts upon or responds.

For example, the information received in the communication from UIS 104 (e.g., the energy price and/or the notification of the demand response event) can be provided (e.g., displayed) to user 110 by wearable device 112. For instance, the information can be provided to user 110 via a user interface of wearable device 112, as will be further described herein (e.g., in connection with FIG. 5).

The information received in the communication from UIS 104 and provided to user 110 can be dependent upon (e.g., relevant and/or specific to) the location of wearable device 112 (e.g., the location of user 110). For example, the information may only be sent to wearable device 112 (e.g., API 114) by UIS 104, and/or may only be provided to user 110 by wearable device 112, if the information is relevant to the location of wearable device 112 (e.g., the information may not be sent to wearable device 112 by UIS 104, and/or may not be provided to user 110 by wearable device 112, if the information is not relevant to the location of wearable device 112). That is, if wearable device 112 (e.g., user 110) is located at facility 106, the information may only be sent to wearable device 112 (e.g., API 114) and/or provided to user 110 if the information is relevant to facility 106.

In some embodiments, wearable device 112 can determine its location. In such embodiments, wearable device 112 (e.g., API 114) can send its determined location to UIS 104 (e.g., via the wireless network), and UIS 104 can determine whether the information in the communication is relevant to the location of wearable device 112, and hence determine whether to send the communication to wearable device 112 (e.g., API 114), based on the location received from wearable device 112. Additionally or alternatively in such embodiments, UIS 104 may send the communication to wearable device 112 (e.g., API 114) regardless of the location of wearable device 112 (e.g., UIS 104 may send information for all possible locations of wearable device 112), and wearable device 112 can make the determination of whether the information in the communication is relevant to its determined location and should be provided to user 110.

In some embodiments, UIS 104 can determine the location of wearable device 112. In such embodiments, UIS 104 can determine whether the information in the communication is relevant to the location of wearable device 112, and hence determine whether to send the communication to wearable device 112 (e.g., API 114), based on the location at which it determines wearable device 112 to be.

The location of wearable device 112 can be determined by UIS 104 and/or wearable device 112 using, for example, global positioning systems (GPS) within wearable device 112, cellular tower locations, WiFi access point locations, WiFi signal strengths, and/or Bluetooth access point locations, among other remote location communication mechanisms, as will be understood by those of skill in the art. As an additional example, wearable device 112 can include sensors for determining its location.

Because device 112 is a wearable device being worn by (e.g., on the person of) user 110, its location determination may be more accurate (e.g., may be more likely to reflect the actual location of user 110) than if device 112 were a non-wearable mobile device, such as a smart phone. For example, because device 112 is a wearable device being worn by user 110, it will most likely remain with user 110 (e.g., remain at the user's actual location) as user 110 moves from room to room of facility 106, and as user 110 enters and leaves facility 106. In contrast, if device 112 were a non-wearable device (e.g., a smart phone), user 110 may leave (e.g., forget) it in one room of facility 106 as he or she moves from room to room, leave it outside of facility 106 when he or she enters facility 106, and/or leave it inside of facility 106 when he or she is outside of facility 106.

As such, in some embodiments, the determined location of wearable device 112 can be (e.g., correspond to) a particular room in facility 106. That is, in such embodiments, the information received in the communication from UIS 104 and provided to user 110 can be dependent upon which room of facility 106 user 110 is in. An example of such an embodiment will be further described herein (e.g., in connection with FIG. 4).

Further, because device 112 is a wearable device being worn by user 110 that will most likely remain with user 110, the information received in the communication from UIS 104 may be provided to (e.g., seen by) user 110 instantaneously (e.g., as soon as it is received from UIS 104 by wearable device 112). In contrast, if device 112 were a non-wearable device (e.g., a smart phone) that may be left in a different location than user 110, user 110 may not have the device when it receives the communication from UIS 104. As such, by the time the information in the communication is provided to (e.g., seen by) user 110, the information may be no longer relevant to the location of user 110 and/or out of date.

In some embodiments, wearable device 112 can determine a comfort level (e.g., physical comfort) of user 110. For example, wearable device 112 can determine the comfort level of user 110 based on skin qualities of user 110 determined (e.g., measured) by sensors of wearable device 112. Additionally or alternatively, wearable device 112 can determine the comfort level of user 110 based on the temperature and/or humidity of the location of user 110 determined (e.g., measured) by sensors of wearable device 112. In such embodiments, wearable device 112 (e.g., API 114) may send (e.g., via the wireless network) the determined comfort level to UIS 104, and UIS 104 may determine whether the information in the communication is relevant to user 110, and hence whether to send the communication to wearable device 112 (e.g., API 114), based on the determined comfort level. That is, the comfort level of user 110 can affect whether the information in the communication is relevant. For example, the information in the communication may be more likely to be relevant to user 110 if user 110 has a low comfort level (e.g., is uncomfortable).

In some embodiments, UIS 104 can determine (e.g., count) the number of occupants (e.g., people) in facility 106. For example, UIS 104 can determine the number of occupants in facility 106 based on how many different wearable and/or non-wearable mobile device signals (e.g., communication signals) are present in facility 106 (e.g., each device signal may correspond to a different occupant in facility 106). As an additional example, UIS may receive the number of occupants in facility 106 from another source, such as, for instance, wearable device 112 (e.g., user 110). In such embodiments, UIS 104 may determine whether the information in the communication is relevant to user 110, and hence whether to send the communication to wearable device 112 (e.g., API 114), based on the number of occupants in facility 106. That is, the number of occupants in facility 106 (e.g., whether there are a large number of occupants or a small number of occupants) can affect whether the information in the communication is relevant.

Wearable device 112 may receive (e.g., via the user interface) a command from user 110 to adjust the energy consumption of facility 106 based on (e.g., in response to) the information received in the communication from UIS 104 (e.g., the energy price and/or the notification of the demand response event) and provided to user 110. That is, user 110 may determine, based on the information received in the communication and provided to the user by wearable device 112, to adjust the energy consumption of facility 106, and input a command to make the adjustment into wearable device 112. For example, if the information received in the communication includes an indication the price of the energy from utility 102 has increased or will increase, user 110 may determine that a decrease in the energy consumption of facility 106 should occur, and input the corresponding command into wearable device 112.

The command to adjust the energy consumption of facility 106 can include, for example, a command to adjust the energy consumption of one or more loads of the facility. For instance, if the information received in the communication includes an indication the price of the energy from utility 102 has increased or will increase, the command may include a command to decrease the energy consumption of one or more loads of facility 106. As an additional example, if facility 106 is a residential home, the command to adjust the energy consumption of facility 106 can include a command to adjust the set point of the thermostat of the home. For instance, if the information received in the communication includes an indication the price of the energy from utility 102 has increased or will increase, the command may include a command to increase or decrease the set point of the thermostat as needed to reduce the amount of energy used to heat or cool the home.

As an additional example, if the communication (e.g., the information in the communication) received from UIS 104 and provided to user 110 includes a notification of a demand response event associated with the energy being provided to facility 106 by utility 102, wearable device 112 may receive (e.g., via the user interface) a command from user 110 to opt in or opt out of the demand response event. That is, user 110 may determine, based on the information received in the communication and provided to the user by wearable device 112, whether to opt in or opt out of the demand response event, and input the corresponding command into wearable device 111.

The command(s) received by wearable device 112 from user 110 (e.g., the command to adjust the energy consumption of facility 106 and/or the command to opt in or opt out of the demand response event) can be based on (e.g., relevant and/or specific to) the location of wearable device 112 (e.g., the location of user 110), in a manner analogous to that previously described herein. Additionally or alternatively, the command(s) can be based on the comfort level of user 110 and/or the number of occupants in facility 106, in a manner analogous to that previously described herein.

In some embodiments, the command to adjust the energy consumption of facility 106 and/or the command to opt in or out of the demand response event can be automatically (e.g., without input or instruction from user 110) generated by wearable device 112 based on the location of wearable device 112, the comfort level of user 110, and/or the number of occupants in facility 106. That is, in such embodiments, the commands may not have to be received from user 110.

Wearable device 112 (e.g., API 114) can send (e.g., via the wireless network) the command to adjust the energy consumption of facility 106 to EMS 108, and EMS 108 can adjust (e.g., make the adjustment of) the energy consumption of facility 106 upon receiving the command. That is, EMS 108 can take the actions needed to execute the command upon receiving the command from wearable device 112 (e.g., from API 114). Further, wearable device 112 (e.g., API 114) can send the command to opt in or opt out of the demand response event to UIS 104, and UIS 104 can opt facility 106 in or out of the demand response event upon receiving the command. That is, UIS 104 can opt facility 106 in to the demand response event upon receiving an opt in command from wearable device 112 (e.g., from API 114), and UIS 104 can opt facility 106 out of the demand response event upon receiving an opt out command from wearable device 112 (e.g., from API 114).

Further, in embodiments in which wearable device 112 determines the comfort level of user 110, wearable device 112 (e.g., API 114) may send (e.g., via the wireless network) the determined comfort level to EMS 108, and EMS 108 can adjust the energy consumption of facility 106 based on the comfort level. For example, if the comfort level indicates user 110 is too hot or too cold, EMS 108 can adjust the energy consumption of facility 106 as appropriate and/or needed to cool or heat the location of user 110. Further, EMS 108 can adjust the energy consumption of facility 106 based on weighted, cumulative comfort levels from multiple wearable devices at the location. For instance, if there are eight people at a meeting in a conference room, and six of the eight's respective wearable devices indicate they are comfortable and two of the eight's respective wearable devices indicate they are too warm, but one of those two is a senior executive, EMS 108 may give the executive's comfort level priority and cool the room.

Further, in embodiments in which the number of occupants in facility 106 has been determined, EMS 108 can adjust the energy consumption of facility 106 based on the number of occupants. For example, if a large number of people are determined to be in a room of a facility that has a current temperature of 68 degrees but a cooling set point of 72 degrees, EMS 108 may start cooling the room before the temperature of the room rises to the set point in order to prevent the room temperature from exceeding the set point.

Figure 2:
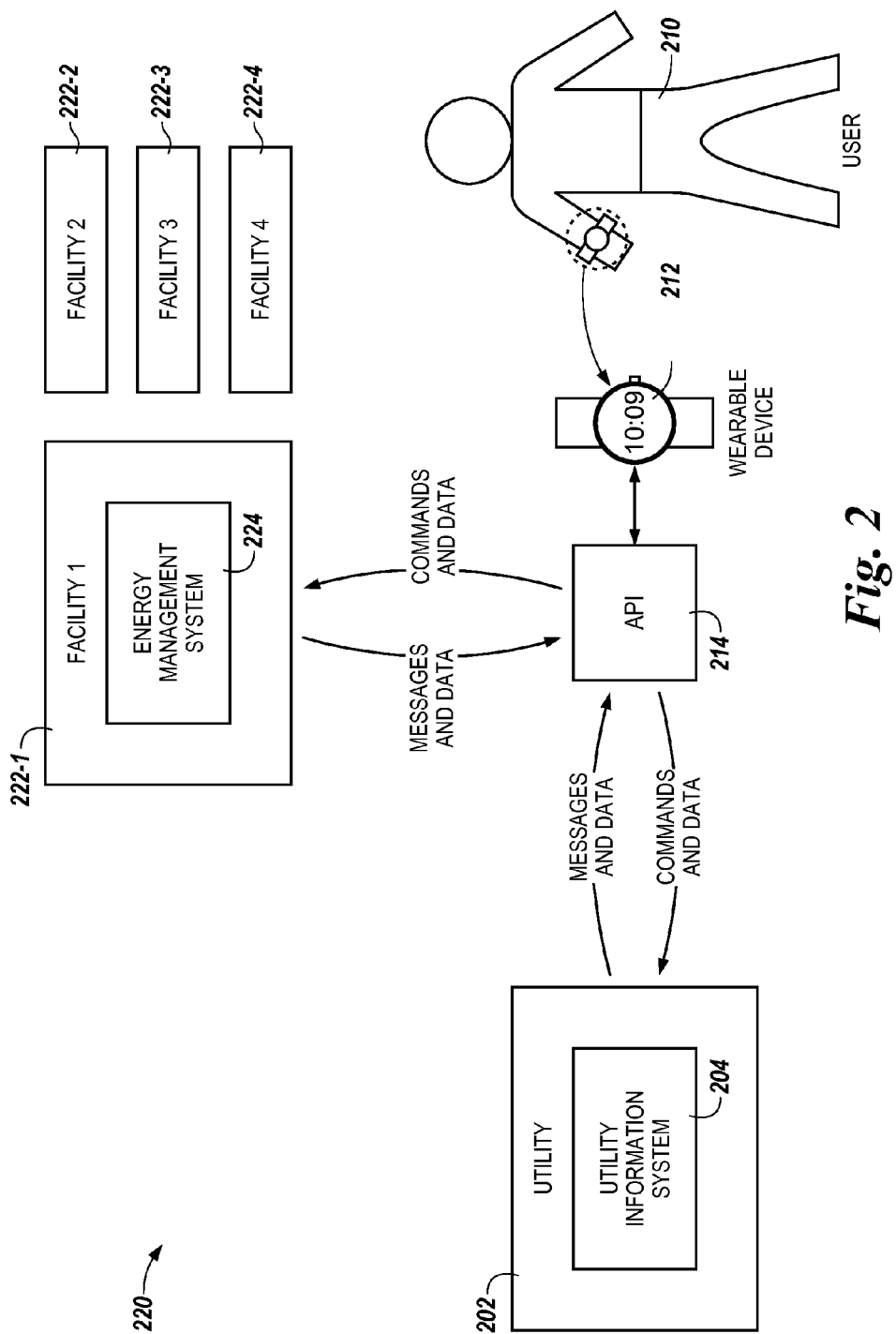
FIG. 2 illustrates an additional example of a system for energy management using a wearable device in accordance with one or more embodiments of the present disclosure.

FIG. 2 illustrates an additional example of a system 220 for energy management using a wearable device 212 in accordance with one or more embodiments of the present disclosure. System 220 can be analogous to system 100 previously described in connection with FIG. 1 (e.g., system 220 can include a utility 202, a UIS 204, a user 210, a wearable device 212, and an API 214 analogous to utility 102, UIS 104, user 110, wearable device 112, and API 114 described in connection with FIG. 1), except that system 220 can include a plurality of facilities 222-1, 222-2, 222-3, 222-4, as illustrated in FIG. 2. That is, FIG. 2 illustrates energy management interactions among multiple facilities. Although the example illustrated in FIG. 2 includes four facilities, embodiments of the present disclosure are not limited to a particular number of facilities.

Facilities 222-1 (facility 1), 222-2 (facility 2), 222-3, and 222-4 (facility 4) can be any type of facility, location, building, etc. that receives and/or consumes (e.g., uses) energy from utility 202. For example, facilities 222-1, 222-2, 222-3, and 222-4 may be large commercial or industrial facilities, small businesses, or residential homes, among other types of energy consuming facilities. Facilities 222-1, 222-2, 222-3, and 222-4 may each be the same type of facility, or may be different types of facilities.

As shown in FIG. 2, facility 222-1 can include an energy management system (EMS) 228 that is used to manage (e.g., control) the energy consumption of facility 222-1. Further, although not shown in FIG. 2 for simplicity and so as not to obscure embodiments of the present disclosure, facilities 222-2, 222-3, and 222-4 can each include an EMS. The EMSs can be any system capable of controlling the energy consuming loads of its respective facility, in a manner analogous to that previously described herein (e.g., in connection with FIG. 1).

In the example illustrated in FIG. 2, wearable device 212 and user 210 are located near facility 222-1, but far from facilities 222-2, 222-3, and 222-4. For instance, wearable device 212 may be outside the wireless communication ranges of the EMSs of facilities 222-2, 222-3, and 222-4. Hence, wearable device 212 may be in communication with EMS 224, but not with the EMSs of facilities 222-2, 222-3, or 222-4, as illustrated in FIG. 2.

The communications between wearable device 212 (e.g., API 214) and EMS 224 and UIS 204 can be analogous to the communications between wearable device 112 and EMS 108 and UIS 104 previously described in connection with FIG. 1. For example, the communications between wearable device 212 and EMS 224 and UIS 204 can be dependent upon (e.g., relevant and/or specific to) the location of wearable device 212 (e.g., the location of user 210), as previously described herein. As such, in the example illustrated in FIG. 2, only energy management information (e.g., energy price information and/or demand response event information) that is relevant to facility 222-1 may be communicated with and/or displayed by wearable device 212. That is, energy management information relevant to facilities 222-2, 222-3, or 222-4 may not be communicated with and/or displayed by wearable device 212, unless that information is also relevant to facility 222-1.

Figure 3:
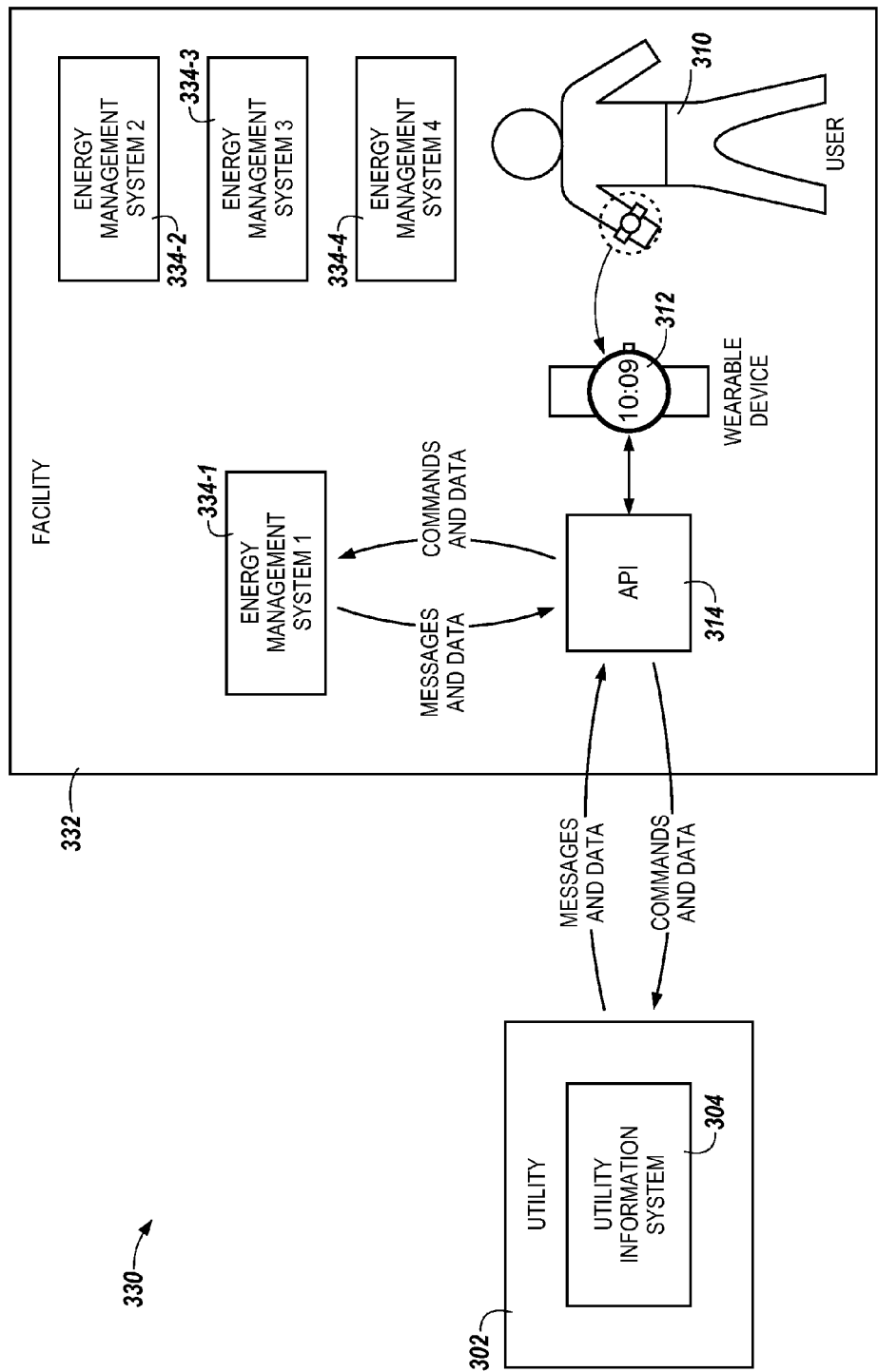
FIG. 3 illustrates an additional example of a system for energy management using a wearable device in accordance with one or more embodiments of the present disclosure.

FIG. 3 illustrates an additional example of a system 330 for energy management using a wearable device 312 in accordance with one or more embodiments of the present disclosure. System 330 can be analogous to system 100 previously described in connection with FIG. 1 (e.g., system 330 can include a utility 302, a UIS 304, a user 310, a wearable device 312, and an API 314 analogous to utility 102, UIS 104, user 110, wearable device 112, and API 114 described in connection with FIG. 1), except that system 330 can include a facility 332 having a plurality of EMSs 334-1, 334-2, 334-3, 334-4, as illustrated in FIG. 3. That is, FIG. 3 illustrates energy management interactions among multiple EMSs within one facility. Although the example illustrated in FIG. 3 includes four EMSs, embodiments of the present disclosure are not limited to a particular number of EMSs.

Facility 332 can be any type of facility, location, building, etc. that receives and/or consumes (e.g., uses) energy from utility 302, in a manner analogous to that previously described herein (e.g., in connection with FIG. 1). EMSs 334-1 (EMS 1), 334-2 (EMS 2), 334-3 (EMS 3), 334-4 (EMS 4) can each manage (e.g., control) the energy consumption of different portions of facility 332. For example, each EMS 334-1, 334-2, 334-3, 334-4 can manage the energy consumption of different energy consuming loads, rooms, areas, or zones of facility 332.

In the example shown in FIG. 3, wearable device 312 (e.g., API 314) is in communication with UIS 304 and EMS 334-1. The communications between wearable device 312 (e.g., API 314) and EMS 334-1 and UIS 304 can be analogous to the communications between wearable device 112 and EMS 108 and UIS 104 previously described in connection with FIG. 1. Further, although not shown in FIG. 3 for simplicity and so as not to obscure embodiments of the present disclosure, wearable device 312 may also be in communication with EMSs 334-2, 334-3, and 334-4 in a manner analogous to the communication with EMS 334-1. For example, a sending portion of EMSs 334-2, 334-3, and 334-4 may be coded or tuned to frequencies different than that of EMS 334-1, so that they are distinguishable and thus not necessarily responsive to communications sent from wearable device 312 specifically to EMS 334-1.

The communications between wearable device 312, UIS 304, and EMSs 334-1, 334-2, 334-3, and/or 334-4 can be dependent upon (e.g., relevant and/or specific to) the location of wearable device 312 (e.g., the location of user 310), as previously described herein. For instance, in the example illustrated in FIG. 3, because user 310 is located near EMS 334-1 (e.g., closer to EMS 334-1 than EMSs 334-2, 334-3, or 334-4), only energy management information (e.g., energy price information and/or demand response event information) that is relevant to EMS 334-1 may be communicated with and/or displayed by wearable device 312. That is, energy management information relevant to EMSs 334-2, 334-3, and 334-4 may not be communicated with and/or displayed by wearable device 312, unless that information is also relevant to EMS 334-1.

Figure 4:
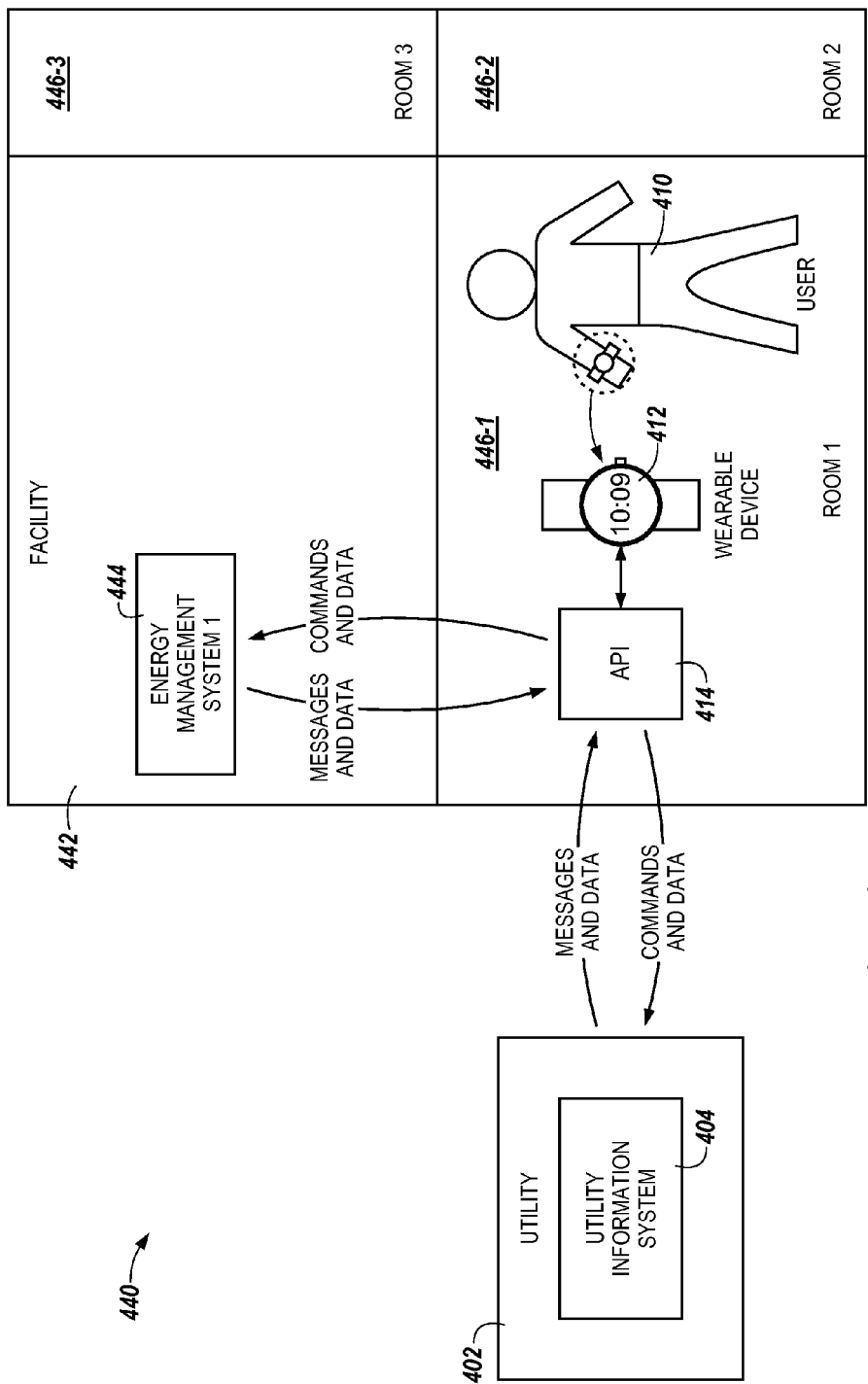
FIG. 4 illustrates an additional example of a system for energy management using a wearable device in accordance with one or more embodiments of the present disclosure.

FIG. 4 illustrates an additional example of a system 440 for energy management using a wearable device 412 in accordance with one or more embodiments of the present disclosure. System 440 can be analogous to system 100 previously described in connection with FIG. 1 (e.g., system 440 can include a utility 402, a UIS 404, a user 410, a wearable device 412, and an API 414 analogous to utility 102, UIS 104, user 110, wearable device 112, and API 114 described in connection with FIG. 1), except that system 440 can include a facility 442 having a an EMS 444 and a plurality of rooms 446-1, 446-2, 446-3, as illustrated in FIG. 4. That is, FIG. 4 illustrates energy management interactions in a facility with one EMS and multiple rooms. Although the example illustrated in FIG. 4 includes three rooms, embodiments of the present disclosure are not limited to a facility with a particular number of rooms.

Facility 442 can be a residential home that receives and/or consumes (e.g., uses) energy from utility 402, in a manner analogous to that previously described herein (e.g., in connection with FIG. 1). EMS 444 can manage (e.g., control) the energy consumption of the rooms 446-1 (room 1), 446-2 (room 2), 446-3 (room 3) of facility 442. For example, EMS 444 can be a thermostat.

In the example shown in FIG. 4, wearable device 412 (e.g., API 414) is in communication with UIS 404 and EMS 444. The communications between wearable device 412 (e.g., API 414) and EMS 444 and UIS 404 can be analogous to the communications between wearable device 112 and EMS 108 and UIS 104 previously described in connection with FIG. 1. For example, the communications between wearable device 412 and EMS 444 and UIS 404 can be dependent upon (e.g., relevant and/or specific to) the location of wearable device 412 (e.g., the location of user 410), as previously described herein. For instance, the communications can be dependent upon which room of facility 442 user 410 is in, as previously described herein.

As such, in the example illustrated in FIG. 4, only energy management information (e.g., energy price information and/or demand response event information) that is relevant to room 446-1 of facility 442 may be communicated with and/or displayed by wearable device 412. That is, energy management information relevant to rooms 446-2 or 446-3 may not be communicated with and/or displayed by wearable device 412, unless that information is also relevant to room 446-1.

Figure 5:
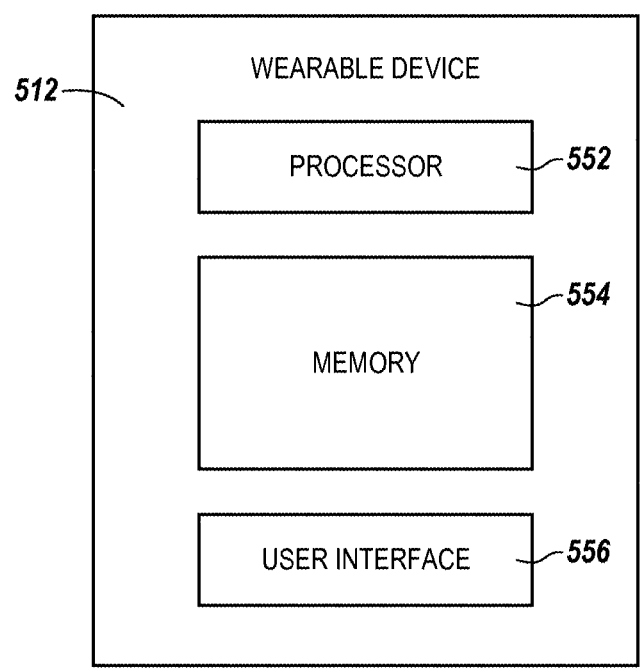
FIG. 5 illustrates an example of a wearable device in accordance with one or more embodiments of the present disclosure.

FIG. 5 illustrates an example of a wearable device 512 in accordance with one or more embodiments of the present disclosure. Wearable device 512 can be used to manage energy consumption in accordance with embodiments of the present disclosure. For example, wearable device 512 can be wearable device 112, 212, 312, and/or 412 previously described in connection with FIGS. 1, 2, 3, and 4, respectively.

As shown in FIG. 5, wearable device 512 can include a memory 554 and a processor 552. Memory 554 can be any type of storage medium that can be accessed by processor 552 to perform various examples of the present disclosure. For example, memory 554 can be a non-transitory computer readable medium having computer readable instructions (e.g., computer program instructions) stored thereon that are executable by processor 552 to manage energy consumption in accordance with the present disclosure. That is, processor 552 can execute the executable instructions stored in memory 554 to manage energy consumption in accordance with the present disclosure.

Memory 554 can be volatile or nonvolatile memory. Memory 554 can also be removable (e.g., portable) memory, or non-removable (e.g., internal) memory. For example, memory 554 can be random access memory (RAM) (e.g., dynamic random access memory (DRAM) and/or phase change random access memory (PCRAM)), read-only memory (ROM) (e.g., electrically erasable programmable read-only memory (EEPROM) and/or compact-disk read-only memory (CD-ROM)), flash memory, a laser disk, a digital versatile disk (DVD) or other optical disk storage, and/or a magnetic medium such as magnetic cassettes, tapes, or disks, among other types of memory.

Further, although memory 554 is illustrated as being located in wearable device 512, embodiments of the present disclosure are not so limited. For example, memory 554 can also be located internal to another computing resource (e.g., enabling computer readable instructions to be downloaded over the Internet or another wired or wireless connection).

As shown in FIG. 5, wearable device 512 can include a user interface 556. A user (e.g., operator) of wearable device 512, such as, for instance, user 110, 210, 310, and/or 410 previously described in connection with FIGS. 1, 2, 3, and 4, respectively, can interact with wearable device 512 via user interface 556. For example, user interface 556 can provide (e.g., display and/or present) information to the user of wearable device 556, such as, for instance, information included in communications received from a utility, as previously described herein. Further, user interface 556 can receive information from (e.g., input by) the user of wearable device 556, such as, for example, commands from the user, as previously described herein.

In some embodiments, user interface 556 can be a graphical user interface (GUI) that can include a display (e.g., a screen) that can provide and/or receive information to and/or from the user of wearable device 512. The display can be, for instance, a touch-screen (e.g., the GUI can include touch-screen capabilities). Embodiments of the present disclosure, however, are not limited to a particular type(s) of user interface.

Further, although user interface 556 is illustrated as being located in wearable device 512, embodiments of the present disclosure are not so limited. For example, user interface 556 (e.g., the display) can be remote from wearable device 512.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the disclosure includes any other applications in which the above structures and methods are used. Therefore, the scope of various embodiments of the disclosure should be determined with reference to the appended claims, along with the full range of equivalents to which such claims are entitled.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed:

1. An apparatus for energy management, comprising:
   a user interface;
   a memory; and
   a processor configured to execute executable instructions stored in the memory to:
   receive, from a user of the apparatus via the user interface, a count of the number of occupants in a facility;

send the count of the number of occupants in the facility to a utility information system of a utility;

receive, based on the count of the number of occupants in the facility sent to the utility information system of the utility, a communication from the utility information system of the utility, wherein the communication includes information associated with energy being provided to the facility by the utility and a notification of a demand response event, and wherein the facility is a residential home;

provide, via the user interface, the information to the user of the apparatus;

determine a location of the apparatus is a particular room in the residential home;

receive, via the user interface, a command from the user to adjust energy consumption of the facility and a command from the user to opt in or opt out of the demand response event, wherein the command to adjust the energy consumption of the facility and the command to opt in or opt out of the demand response event are based, at least in part, on the information and the determination the location of the apparatus is the particular room in the residential home; and send the command to adjust the energy consumption of the facility and the command to opt in or opt out of the demand response event to an energy management system of the facility;

wherein the apparatus is a wearable device.

2. The apparatus of claim 1, wherein the information associated with the energy being provided to the facility by the utility is dependent upon the location of the apparatus.

3. The apparatus of claim 2, wherein the processor is configured to execute the instructions to:

send the determined location to the utility information system of the utility.

4. The apparatus of claim 1, wherein the wearable device is a smart watch.

5. The apparatus of claim 1, wherein the information associated with the energy being provided to the facility by the utility includes a price of the energy being provided to the facility by the utility.

6. The apparatus of claim 1, wherein the command to adjust the energy consumption of the facility includes a command to adjust a set point of a thermostat of the facility.

7. A method for energy management, comprising:

receiving, by a wearable device from a user of the wearable device, a count of the number of occupants in a facility;

sending, by the wearable device, the count of the number of occupants in the facility to a utility information system of a utility;

receiving, by the wearable device based on the count of the number of occupants in the facility sent to the utility information system of the utility, a communication from the utility information system of the utility, wherein the communication includes a notification of a demand response event associated with energy being provided to the facility by the utility, wherein the facility is a residential home;

providing, by the wearable device, the notification of the demand response event to the user of the wearable device;

determining, by the wearable device, a location of the wearable device is a particular room in the residential home;

receiving, by the wearable device, a command from the user to opt in or opt out of the demand response event, wherein the command is based, at least in part, on the determination the location of the wearable device is the particular room in the residential home; and sending, by the wearable device, the command to the utility information system of the utility.

8. The method of claim 7, wherein the method includes:

receiving, by the wearable device, a command from the user to adjust energy consumption of the facility based, at least in part, on the demand response event; and sending, by the wearable device, the command to adjust the energy consumption of the facility to an energy management system of the facility.

9. The method of claim 8, wherein the command to adjust the energy consumption of the facility is based, at least in part, on the location of the wearable device.

10. The method of claim 7, wherein the method includes:

determining, by the wearable device, a comfort level of the user of the wearable device;

sending, by the wearable device, the comfort level of the user to the energy management system of the facility; and adjusting, by the energy management system, energy consumption of the facility based, at least in part, on the comfort level of the user.

11. The method of claim 7, wherein the method includes:

determining, by the wearable device, a comfort level of the user of the wearable device;

sending, by the wearable device, the comfort level of the user to the utility information system of the utility; and determining, by the utility information system, whether to send the communication to the wearable device based, at least in part, on the comfort level of the user.

12. A system for energy management, comprising:

a utility information system of a utility, wherein the utility information system of the utility is configured to:

determine a number of occupants in a facility based on how many different mobile device signals are present in the facility; and determine whether to send a communication to a wearable device based, at least in part, on the number of occupants in the facility, wherein the communication includes a notification of a demand response event;

an energy management system of the facility, wherein the facility is a residential home; and the wearable device, wherein the wearable device is configured to:

receive, from the utility information system, the communication;

provide the notification of the demand response event to a user of the wearable device;

determine a location of the wearable device is a particular room in the residential home;

receive, from the user, a command to opt in or opt out of the demand response event and a command to adjust energy consumption of the facility, wherein the command to opt in or opt out of the demand response event and the command to adjust the energy consumption of the facility are based, at least in part, on the determination the location of the wearable device is the particular room in the residential home;

send the command to opt in or opt out of the demand response event to the utility information system; and send the command to adjust the energy consumption of the facility to the energy management system.

13. The system of claim 12, wherein:

the utility information system of the utility is configured to opt the facility in or out of the demand response event upon receiving the command to opt in or opt out from the wearable device; and the energy management system of the facility is configured to adjust the energy consumption of the facility upon receiving the command to adjust the energy consumption of the facility.

14. The system of claim 12, wherein the utility information system of the utility is configured to:

determine whether to send the communication to the wearable device based, at least in part, on the location of the wearable device.

15. The system of claim 12, wherein the command to opt in or opt out of the demand response event and the command to adjust the energy consumption of the facility are based, at least in part, on the number of occupants in the facility.

16. The system of claim 12, wherein the command to adjust the energy consumption of the facility includes a command to adjust a load of the facility.

* * * * *